UNITED STATES PATENT OFFICE.

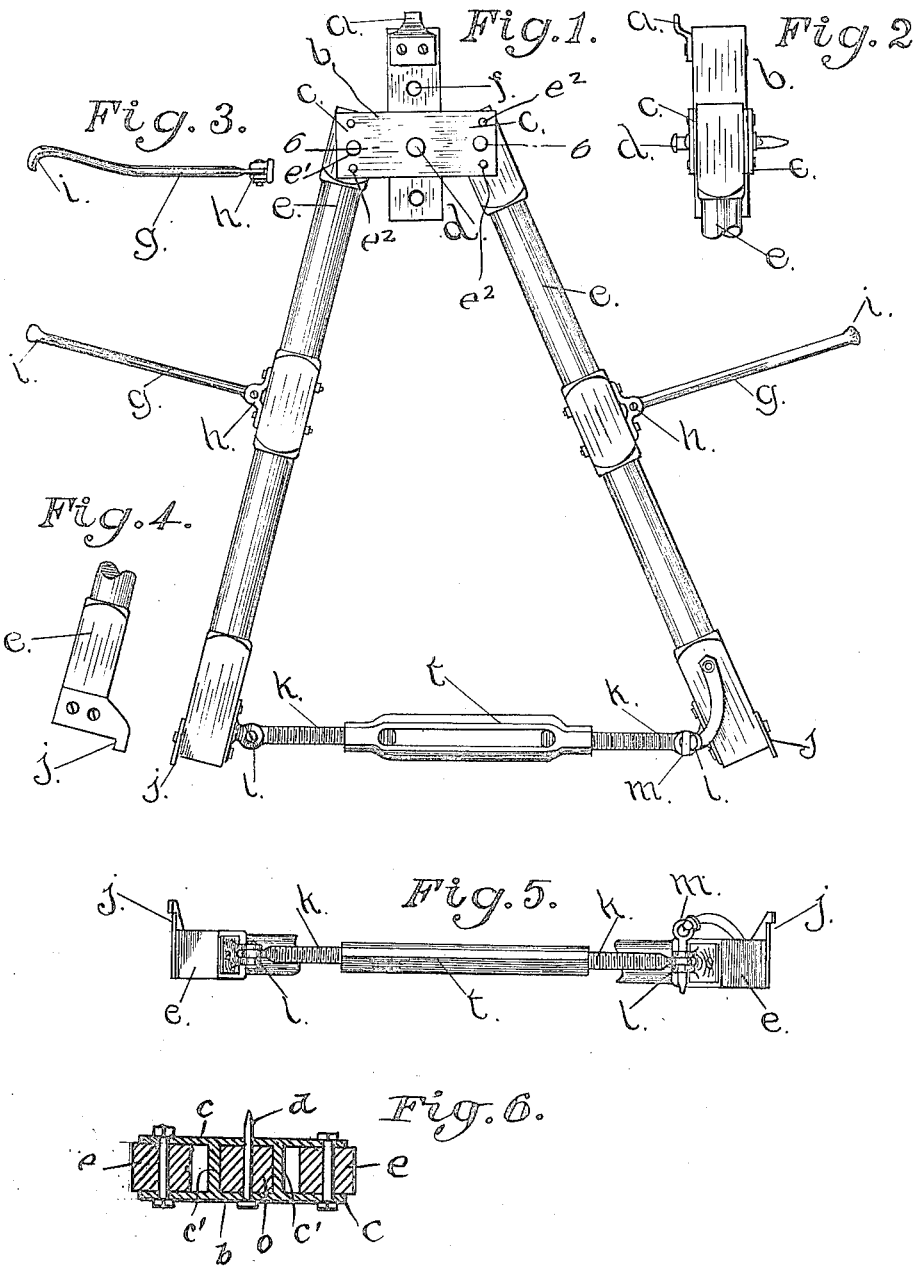

HARLEY TANNEHILL, OF FORT WAYNE, INDIANA, ASSIGNOR TO HIMSELF AND FRED G. SCHWIER, OF FORT WAYNE, INDIANA.

RIM BREAKER AND EXTENDER.

1,301,884.   Specification of Letters Patent.   Patented Apr. 29, 1919.

Application filed June 13, 1917. Serial No. 174,480.

*To all whom it may concern:*

Be it known that I, HARLEY TANNEHILL, a citizen of the United States, residing at Fort Wayne, in the county of Allen and the State of Indiana, have invented a new and useful Rim Breaker and Extender, of which the following is a specification.

This invention relates to a tire rim tool, the primary object of the invention being to provide a tool of this kind by which either straight or diagonal split rims can be quickly and conveniently removed from or replaced within the circumference of the tire.

A further object of the invention is to provide a rim tool which can be quickly and rigidly attached to the rim within its circumference and which embodies adjustable means whereby the rim can be contracted or expanded, said means maintaining the rim and tool in fixed adjusted relative position so that the rim and tool can be handled as a unitary structure.

A still further object of the invention is to provide a rim tool which embodies means for adjusting it to rims of various diameters and sizes.

With these and other objects in view, the invention comprises the various novel features of construction, combination and arrangement of parts as will be fully described hereinafter and afterward specifically claimed.

Referring to the drawing:

Figure 1 represents a side elevation of the tool shown set in a position to be applied to a tire rim.

Fig. 2 represents an edge view of the upper portion of the tool.

Fig. 3 represents a side elevation of one of the hook arms.

Fig. 4 represents an edge view of the lower portion of the tool.

Fig. 5 represents an end elevation of the tool.

Fig. 6 represents a sectional view taken on the line 6—6 on Fig. 1.

Similar characters of reference are used to denote like parts throughout the following specification and the accompanying drawings.

By particular reference to the drawing it will be seen that the device consists of an A-shaped frame embodying a pair of bars $e$—$e$ that have their opposite ends connected by a part $b$ and a turnbuckle $t$.

The part $b$ consists of a pair of side plates $c$ spaced apart by a pair of webs $c'$ which coöperate with the side plates to form a container in which is adjustably mounted a member $o$ by a bolt or pin $d$ disposed transversely through the plates $c$. Apertures $f$ are formed in the member $o$ whereby said member can be adjusted. A hook $c^1$ is secured to the outer end of and on one side face of the member $o$ and is adapted to engage one edge of the tire rim.

Each of the bars $e$ is pivotally mounted between the plates $c$ by a bolt $e'$, said plates being provided with apertures $e^2$ for the pivotal adjustment of the bars.

The turnbuckle $t$ has its ends pivotally connected to eyes $l$ carried by the opposed ends of the bars $e$—$e$, one of the turnbuckle's ends being connected by a removable pin $m$ attached to the adjacent bar $e$ by a flexible element.

Hooks $j$ are attached to the expanding ends of the bars $e$—$e$ and are also adapted to engage the tire rim.

$g$—$g$ indicates a pair of hook arms pivotally connected to the intermediate portions of the bars $e$—$e$, as at $h$, and have their outer ends formed with hooks $i$—$i$ which are also adapted to engage the edge of the tire rim.

In practice and when it is desired to remove a split rim from a tire, the tool is attached to and positioned within the rim so that the diverging ends of the bars will be on opposite sides of the rim split with one of bar ends adjacent the rim split whereby upon the contraction of the tool, the ends of the rim will be drawn radially inwardly over each other, at the same time radially inward stress being applied to the rim at the points of connection of the hooks $i$—$i$ and $j$—$j$ thereby freeing the rim from the tire. When the tool and rim have been sufficiently contracted they may be both removed as a single unit from the tire.

Likewise the rim and tool may, as a unitary structure, be replaced with the circumference of a tire and the turnbuckle rotated to allow the rim to expand to its normal position in engagement with the tire.

It is to be further noted that by the adjustment of the turnbuckle and the member *o*, the tool can be adjusted to fit rims of various sizes. And when desired the tool can be quickly folded in compact form so as to occupy only a minimum amount of space.

I claim—

A tool for removing tires from split demountable rims and replacing them thereon comprising a pair of converging bars, means for pivotally connecting the converging ends of said bars, adjustable contractible and expansible means pivotally connecting the diverging ends of said bars to hold said parts in any adjusted position, means carried by the first named connecting means and by the diverging ends of said bars for detachably connecting the tool to the tire rim, and hook arms pivotally connected to said bars for connection with the tire rim.

HARLEY TANNEHILL.

Witnesses:
CHARLES C. LA TOURETTE,
RALPH E. LANDIS.